Figure 1:
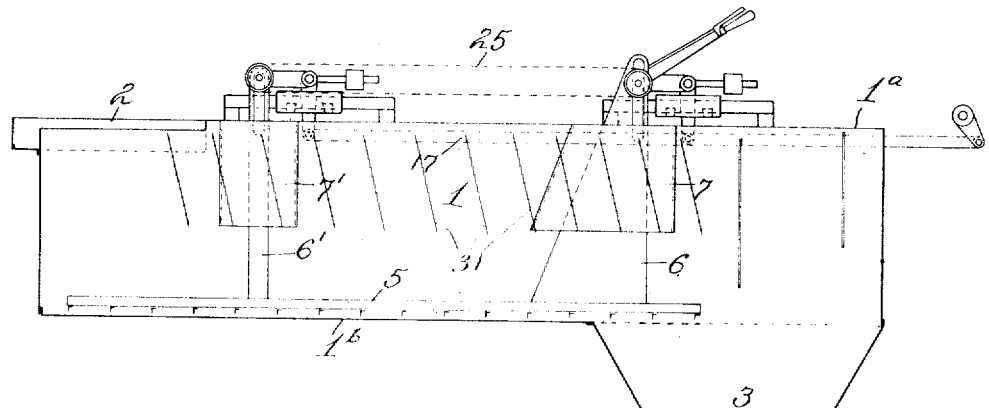

H. B. LOWDEN.
APPARATUS FOR CLARIFYING LIQUIDS AND THICKENING PULPS.
APPLICATION FILED DEC. 27, 1912.

1,098,812.

Patented June 2, 1914.

2 SHEETS—SHEET 1.

WITNESSES:
Benton M. Stahl
Chas. F. Calhoun

INVENTOR.
Hugh B. Lowden.
BY
Huan Middleton Donaldson & Huan
ATTORNEY.

H. B. LOWDEN.
APPARATUS FOR CLARIFYING LIQUIDS AND THICKENING PULPS.
APPLICATION FILED DEC. 27, 1912.
1,098,812.
Patented June 2, 1914.
2 SHEETS—SHEET 2.
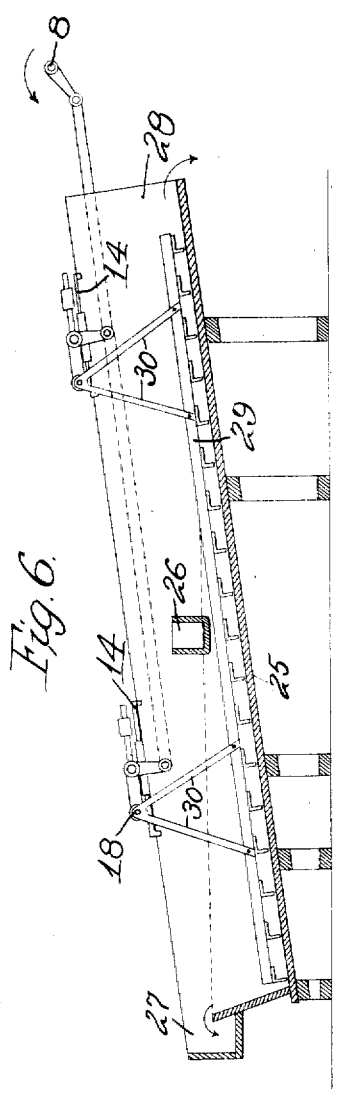
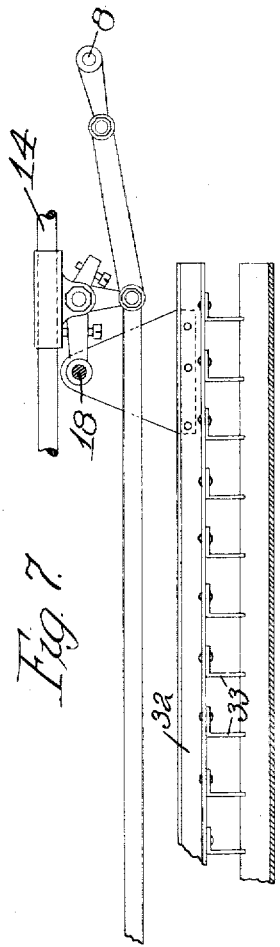
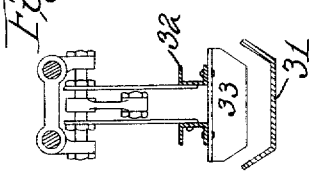
Inventor
Hugh B. Lowden

UNITED STATES PATENT OFFICE.

HUGH B. LOWDEN, OF DENVER, COLORADO, ASSIGNOR TO COLORADO IRON WORKS COMPANY, OF DENVER, COLORADO, A CORPORATION OF MAINE.

APPARATUS FOR CLARIFYING LIQUIDS AND THICKENING PULPS.

1,098,812.   Specification of Letters Patent.   Patented June 2, 1914.

Application filed December 27, 1912. Serial No. 738,925.

*To all whom it may concern:*

Be it known that I, HUGH B. LOWDEN, citizen of the United States, residing at Denver, Colorado, have invented certain new and useful Improvements in Apparatus for Clarifying Liquids and Thickening Pulps, of which the following is a specification.

My invention relates to an improved apparatus for clarifying liquids and thickening pulps, in which the material is subjected to quiet settling, the solids subsiding and the clear liquid overflowing continuously, with provision for the removal of the solids in the form of a condensed or thickened pulp.

The apparatus is adapted to the thickening of slimes in the cyanid process of gold extraction, delivering clear solution for precipitation and a thickened pulp suitable for filtration, and to other like separations made in this process; to the settling and collection of kaolin carried in a large relative volume of water and other similar work; and by slight modification or mode of operation or both, to the separation of pulps into two products, one consisting of the coarser solids and the other of the finer suspended matter or slimes.

For clarifying and thickening on a large scale in the cyanid process simple cones lack capacity, and the flat bottom tanks heretofore in use are defective in the means for moving the settled solids toward the outlet. In round tanks with radial rakes operated from a central vertical shaft, the leverage against which the arms operate causes frequent breakage, and in rectangular tanks the mechanisms contain vital working parts submerged in the pulp, entailing prohibitive wear, as well as stuffing boxes for transmitting motion to the rakes. My invention is designed to overcome these defects by providing means for moving the settled solids to their point of discharge, in which the advantages of the substantially rectangular tank and rectilinear raking motion are retained, and no joints subject to wear are submerged in the pulp.

In the drawing forming part of this specification, I have shown a tank of a form similar to that shown in Letters Patent of the United States No. 976,923, dated November 29, 1910, as the inclined baffles there shown are of acknowledged value and the apparatus contains other desirable features.

In my invention the rake consists of a series of transverse blades suitably joined together to move in unison, connected with a mechanism placed without the tank by upwardly extending members through which the motion is imparted to it.

To prevent disturbance of the upper part of the contents of the body of the tank by the motion of the uprights, I surround each of them by a partition or skirt, open top and bottom, forming a space within which such disturbance is confined. These skirts form convenient points of attachment for the baffles.

The desired motion, forward along the bottom of the tank and backward in a plane above the bottom, I secure by means of a crank, which, through a bell crank, imparts these respective motions in proper sequence, the mechanism being susceptible of adjustment as to the distance through which the rake is raised and lowered, and as to the length of stroke, within limits, any increase in vertical motion being at the expense of horizontal motion and vice versa.

Figure 2:
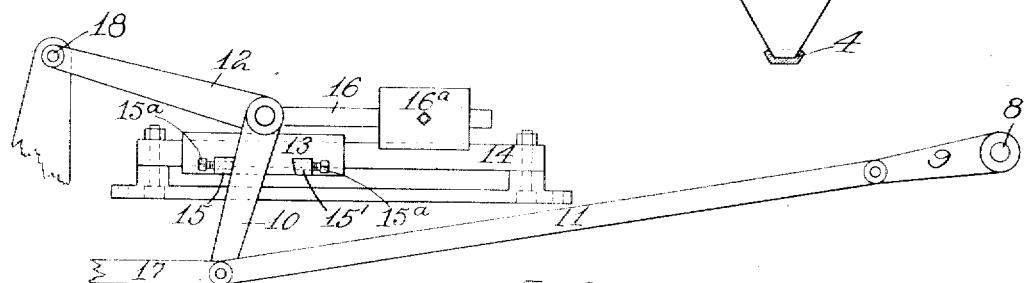
Figures 3, 4, 5:
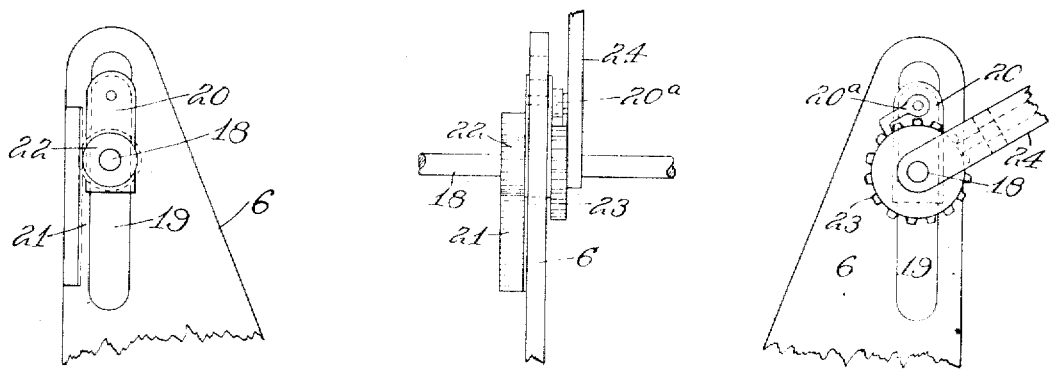

In the drawing Figure 1 is a longitudinal vertical section through a thickening tank and shows the general relation of the parts; Fig. 2 is an enlarged detail view showing in elevation the operating mechanism; Figs. 3, 4 and 5 are views illustrating further details. Fig. 6 is a view illustrating the invention as embodied in a classifier; Figs. 7 and 8 are views illustrating its embodiment as a conveyer.

The feed enters the tank 1 at the point indicated by 1ª, the clear liquid overflows at the opposite end into the launder 2, and the solids settle, those subsiding on the flat portion of the bottom 1ᵇ being raked forward into the cone 3, from which they are drawn at its apex 4, together with the coarser portion of the solids which settle directly into the cone.

The rake is shown at 5, and the uprights which extend upwardly and connect with the operating mechanism are indicated at 6 and 6'. The motion of the rake being very slow (one cycle in about three or four minutes), there will not be any appreciable disturbance communicated to the liquid mixture by the rake. Any moving parts are undesirable in the upper layers of the tank contents, however, and for this reason I surround the uprights by skirts or partitions as indicated at 7 and 7'. These skirts would ordinarily consist of sheet metal and be secured to the sides of the tank in such manner as to leave a space within which the disturbance due to the motion of the uprights would be confined. The spaces so inclosed would be some four or five inches wide, and the necessary length. The skirts extend above the liquid level and downward to a point from which any material disturbance will not be communicated to the clear zone near the surface. The baffles of the Rothwell patent referred to, where used, would be attached to these skirts and directly to the sides of the tank where the sides would be the natural points of attachment, or the skirts might extend the full length of the tank, forming false sides. These baffles are indicated at 31 in Fig. 1.

The rake operating mechanism is shown on an enlarged scale in Fig. 2. In this the shaft 8 has slow rotary motion imparted to it by any suitable means, carrying with it the crank 9. Motion is transmitted by crank 9 to the lever arm 10 through the connecting rod 11. The upright 6 of the rake is carried by the lever arm 12 which is keyed to the same shaft as the lever 10, and forms with it a bell crank journaled on the slider 13. The slider 13 is of any form adapted to slide on a guide, as the bar 14, and has upon it two stops 15 and 15' which limit the motion of the lever arm 10. An arm is shown at 16 which carries a weight 16ᵃ and serves to counterbalance such portion of the weight of the rake as necessary. In the position shown the slider is represented at the end of the backward stroke. Assuming the crank 9 to revolve, the next movement will be the lowering of the arm 12 and with it the rake, which motion will continue until arm 10 comes against stop 15', whereupon the slider will be drawn forward to the end of the stroke; that is, until the crank has advanced 180 degrees from the position shown. The return stroke is produced in like manner, the rake being first lifted, then pushed back. The stops 15 and 15' may be provided with set screws 15ᵃ for adjusting the limits between which the arm 10 is permitted to oscillate, and by means of these set screws the lift of the rake may be increased at the expense of the length of stroke and contrariwise, within limits. The horizontal motion is in a truly straight line, and the vertical motion practically so, the curve depending on the length of the arm 12. There are four of the sliders and bell cranks, one for each upright, the arm 10 being connected to a like arm by the connecting rod 17. The shaft 8 extends across the tank and carries on its other end another crank similar to 9 which operates the sliders on the other side of the tank. The shafts carrying the arms 10 and 12 also extend across the tank and the upper extremities of the uprights may be tied together.

The normal travel of the rake would be forward close to the bottom of the tank, and backward in a plane about four inches above the plane of the forward stroke, but to permit its operation in planes above the normal I provide the device shown in Figs. 3, 4 and 5. These figures show the top of the upright 6, Fig. 3 being a view as seen from the end of the tank and Figs. 4 and 5 being of the two sides projected from Fig. 3 in the usual manner. Where this device is used the shaft 18 would extend across the tank and would have connected thereto the arm 12 at its oscillating end. In the upright 6 is a slot 19, in which a block 20 is adapted to slide vertically, and in this block is journaled the shaft 18. On the upright is a rack 21 meshing with a pinion 22, which is keyed to the shaft 18. Also keyed to the shaft 18 is the ratchet wheel 23 operated by the latch lever 24 and held by a pawl 20ᵃ carried by the block 20. Each of the four uprights is provided with the slot and adjacent rack, but only one need have the ratchet and operating latch lever, as this will serve to operate all four in unison if the shafts 18 are connected by sprocket wheels and chains, as indicated at 25 in Fig. 1, or by other suitable means which would cause like rotation in both shafts.

The operation of the apparatus is as follows: The feed of solid matter suspended in a liquid enters the tank at 1ᵃ, Fig. 1, and passes toward the end at which is the overflow launder 2. The velocity of the pulp in the tank is very low, owing to its great cross section with relation to the inflow, and the finer solids settle on the flat portion of the bottom, the grosser solids mostly subsiding in the inverted cone 3. The transverse scrapers or blades of the rake 5 are spaced apart a less distance than the length of the stroke, so that material carried forward by one blade on a given stroke will be caught by the blade next ahead of it on the following stroke, and thus be advanced toward and into the cone 3, from the apex 4, of which it may be withdrawn by the customary methods. The operation of the rake will normally be with the block 20 bearing against the upper end of the slot 19; that is, with the planes of horizontal motion near the bottom of the tank, but in actual practice unavoidable interferences with the continuous operation of various machines in a plant will occur. Thus, the slime pump or other device used to remove the thickened pulp from 4 might break down or the outlet 4 might become clogged, and if a number of thickening tanks were in use in the plant the diminished flow of slime due to such failure at one of the tanks might not at once be known. Again, the belt driving the thickener or the slime pump might break or leave its pulley, and the condition not be discovered until after the lapse of some time. Even when such conditions are known it is usually desirable to allow the feed to continue entering the tank until repairs are made, as the entire plant must be kept running and the material must be taken care of. Any of these contingencies will cause an accumulation of solids on the bottom of the tank, and if the rake mechanism is inoperative at the time the solids will become very dense. My emergency lift mechanism shown in Figs. 3, 4 and 5 meets such conditions by enabling the rake to operate in planes above normal, so that it may be started in the uppermost position and be lowered a notch or two at intervals until the accumulation is disposed of, and normal working resumed. This emergency lift is also a desirable feature when a plant is shut down, as for a holiday or for extensive repairs, in which cases the rake should be raised before stopping and upon resuming operations lowered gradually, so that the hardened slime can be handled without undue strains.

I do not limit myself to the exact construction shown, as any form of slider in combination with a bell crank or its equivalent will provide the vertical and horizontal components of the motion in their proper sequence, and other means might be used for providing the emergency lift. Nor do I limit myself to the exact application of the mechanisms here disclosed. An important application would be to the separation of relatively coarse, granular solids from very fine solids, when it is desired to separate the coarse for regrinding or other treatment. This is a class of work performed by so-called sand and slime classifiers, and the adaptation of my mechanism to this purpose would consist in using a shallower tank which would be downwardly inclined toward the slime discharge end in such manner that the bath would occupy but a portion of the tank, and in operating the mechanism at a higher speed. The feed should then be into the bath and the agitation caused by the more rapid operation would cause the fine solids to remain in suspension and overflow the lower end of the tank with the liquid, the sands being raked out of the bath, up the inclined bottom and over its edge. Such an embodiment is illustrated in Fig. 6 in which 25 designates the body of the classifier having the feed launder 26 and launder 27 for carrying away the slimes, the sands being delivered at 28. The rake is shown at 29 suspended by uprights 30 from the bell cranks and operated in the manner hereinbefore described. The rake actuating mechanism is also adapted to operate a scraper conveyer which may be either horizontal or inclined, as shown in Figs. 7 and 8. In these figures, 31 designates a conveyer trough and 32 a bar or carrying member carrying a plurality of blades 33 suspended from bell cranks and actuated as will be obvious. The guides 14 need not be parallel to the plane of the rake, as in certain applications it might be desirable to have them otherwise. By a change in the relation of the parts the motion could be reversed, that is to say, the action of the rake or of a plunger, should the mechanism be applied to a feeder, would be a pushing one instead of a dragging one.

I claim as my invention:

1. A separating apparatus comprising a tank, having a submerged discharge outfit for solids a reciprocating rake for moving solids to the point of discharge, means extending through the upper layers of the contents of the tank for imparting motion to the rake, and partitions surrounding said motion imparting means to prevent the communication of disturbance by the moving parts to the upper layers of the contents of the tank.

2. A separating apparatus comprising a tank, a rake, uprights connected to the rake and extending to the top of the tank, operating mechanism connected to the upper ends of said uprights, and stationary skirts inclosing said uprights.

3. In a tank of the class described, a vertically depending horizontally reciprocating part depending within the tank, and a partition open top and bottom inclosing the upper portion of said part serving to confine the disturbance caused by the moving part.

4. A sand and slime classifier, comprising a settling and classifying tank, a rake within the tank, a slider, a bell crank journaled on the slider, means for attaching the rake to one arm of the bell crank, means for communicating motion to the bell crank, and means for limiting the oscillation of the bell crank.

5. A sand and slime classifier comprising a settling and classifying tank, a rake within the tank, a slider supporting the rake to guide its reciprocating motion, and means carried by the slider for raising the rake at the completion of the forward stroke and lowering it at the completion of the backward stroke.

6. In combination a settling and classifying tank, a slider, a bell crank journaled on the slider, a rake within the tank supported from the bell crank, means for rocking the bell crank, and means for effecting vertical adjustment of the rake in relation to the bell crank, substantially as described.

7. In combination a settling and classifying tank, a plurality of sliders mounted above the same, rock shafts supported by the sliders, arms projecting laterally from said rock shafts, a rake suspended from said arms, means for oscillating the rock shaft, and stops for limiting the amount of oscillation of the rock shaft.

8. In combination a settling and classifying tank, a plurality of sliders supported above the same, rock shafts carried by the sliders, arms extending approximately horizontally from the shafts, a rake suspended from said arms, means connected with the shafts for counterbalancing the weight of the rakes, a reciprocating element having connections for oscillating the rock shaft, and means for limiting the amount of oscillation of the rock shaft.

9. In combination a settling and classifying tank, a plurality of sliders supported above the same, rock shafts carried by the sliders, arms extending approximately horizontally from the shafts, a rake, adjustable means connecting the rake with said arms, a reciprocating element having connections for oscillating the rock shafts, and means for limiting the amount of oscillation of the rock shaft.

10. In combination a settling and classifying tank, a slider mounted above the same, a rock shaft journaled in the slider, a rake within the tank, connections between the rake and rock shaft for causing the oscillations of the shaft to raise and lower the rake, a push and pull device having a connection with said shaft to one side of its axis, and means for limiting the oscillation of said shaft.

In testimony whereof, I affix my signature in presence of two witnesses.

HUGH B. LOWDEN.

Witnesses:
F. L. MIDDLETON,
BENNETT S. JONES.

It is hereby certified that in Letters Patent No. 1,098,812, granted June 2, 1914, upon the application of Hugh B. Lowden, of Denver, Colorado, for an improvement in "Apparatus for Clarifying Liquids and Thickening Pulps," an error appears in the printed specification requiring correction as follows: Page 3, line 86, for the word "outfit" read *outlet;* and that the said Letters Patent should be read with this correction therein that the same may conform to the record of the case in the Patent Office.

Signed and sealed this 7th day of July, A. D., 1914.

[SEAL.]

R. F. WHITEHEAD,
*Acting Commissioner of Patents.*